United States Patent [19]
Genduso et al.

[11] Patent Number: 5,802,569
[45] Date of Patent: Sep. 1, 1998

[54] COMPUTER SYSTEM HAVING CACHE PREFETCHING AMOUNT BASED ON CPU REQUEST TYPES

[75] Inventors: Thomas Basilio Genduso, Apex, N.C.; Edward Robert Vanderslice, Boca Raton, Fla.

[73] Assignee: International Business Machines Corp., Armonk, N.Y.

[21] Appl. No.: 636,112

[22] Filed: Apr. 22, 1996

[51] Int. Cl.⁶ .............................. G06F 12/00; G06F 13/00
[52] U.S. Cl. .............................. 711/137; 395/383
[58] Field of Search .............................. 395/464, 421.03, 395/414, 440, 383, 584; 711/137, 113, 213, 204

[56] References Cited

U.S. PATENT DOCUMENTS

| | | | |
|---|---|---|---|
| 3,898,624 | 8/1975 | Tobias | 711/118 |
| 4,489,378 | 12/1984 | Dixon et al. | 711/137 |
| 4,882,642 | 11/1989 | Tayler et al. | 360/78.11 |
| 4,928,239 | 5/1990 | Baum et al. | 711/136 |
| 5,133,060 | 7/1992 | Weber et al. | 711/113 |
| 5,146,578 | 9/1992 | Zangenehpour | 711/137 |
| 5,361,391 | 11/1994 | Westberg | 711/137 |
| 5,390,318 | 2/1995 | Ramakrishnan et al. | 711/158 |
| 5,410,653 | 4/1995 | Macon, Jr. et al. | 711/113 |
| 5,550,998 | 8/1996 | Willis et al. | 711/137 |
| 5,588,128 | 12/1996 | Hicok et al. | 711/204 |

FOREIGN PATENT DOCUMENTS 0366325  10/1989  European Pat. Off.

OTHER PUBLICATIONS

Smith A. J. "Cache Memories." ACM Computing Surveys, vol. 14, No. 3, Sep. 1982, pp. 473–530.
Beresford, R., Solid State Editor, "Partitioning Memory Control for RISC Machines," High Performance Systems, vol. 10, No. 4, Apr. 1989(Manhasset, NY, USA) pp. 58, 62–64.

*Primary Examiner*—Glenn Gossage

[57] ABSTRACT

A computer system is provided which includes a central processing unit (CPU), a main memory, cache memory and a cache controller. The CPU generates a first CPU control signal indicating whether a CPU request is a request for instruction or data and a second CPU control signal indicating whether a request is for retrieving information from memory or for storing information into the memory. The cache controller includes prefetch logic which is responsive to the type of request from the CPU, such as, for example, instruction or data, read or write, for determining the amount of data to be prefetched into the cache memory from the main memory.

12 Claims, 5 Drawing Sheets

COMPUTER SYSTEM HAVING CACHE PREFETCHING AMOUNT BASED ON CPU REQUEST TYPES

TECHNICAL FIELD:

The present invention relates in general to a computer system and in particular to a computer system having data caching capability.

BACKGROUND:

To decrease the time necessary for the central processing unit (CPU) of a computer system to access information stored in memory, systems increasingly use some form of cache memory. As is well-known to those skilled in the art, a cache memory comprises a high speed memory device which is used to store a copy of most frequently accessed instructions and data residing in main memory. The current generation of computers which uses the Pentium® or Pentium Pro® processors by Intel Corp. of Santa Clara, Calif., the PowerPC® processor by International Business Machines (IBM) of Armonk, N.Y. or similar processors typically include an internal level 1 (L1) cache. As understood in the art, L1 cache memory is internal to the CPU accessible via an internal bus. Furthermore, an increasing number of computer systems also utilize an external second level (L2) cache to further enhance system performance. L2 caches are generally larger in size than L1 caches and are located between the CPU and the system memory. Thus, L2 caches are accessible by the CPU via an external processing bus.

To further enhance system performance, a number of conventional systems are designed with a prefetching feature which allows a memory controller to load information without an express request from the CPU for such information. The prefetch feature so provided is premised on the assumption that the CPU would have accessed the prefetched information upon request at cache memory speed which is much faster than the system memory speed. However, the conventional methods for prefetching load information into the CPU according to a predefined number of cache lines. That is, once the CPU requests data from a cache controller, the cache controller in addition to the requested data prefetches a predetermined number of bytes (e.g. a cache line of 32 bytes) of data from the system memory and makes such data available in the cache memory for possible CPU access. However, caching a predefined number of data bytes does not take into account variations in the addressing patterns of a controlling software and may result in prefetching of unnecessary data. Moreover, since prefetching increases overall memory utilization, caching unnecessary information from memory may actually adversely effect system performance in some environments. For example, in one environment prefetching of instruction code from the system memory may improve overall system performance, whereas prefetching data may hinder system performance. In yet another environment the reverse may be true. That is, prefetching data may improve performance, and prefetching instruction code may have an adverse effect on system performance.

Therefore there is a need for a cache memory system with prefetching capability optimized for a wide variety of software environments.

SUMMARY OF THE INVENTION

Briefly, according to the present invention, a computer system includes a CPU, a main memory, cache memory and a cache controller. The CPU generates control signals indicating whether a CPU request is a request for instruction or data and a second CPU control signal indicating whether a request is for retrieving information from memory or for storing information into the memory. The cache controller includes prefetch logic which is responsive to the type of request from the CPU for determining the amount of data to be prefetched into the cache memory from the main memory.

DETAILED DESCRIPTION OF THE PREFERRED EMBODIMENT

Figure 1:
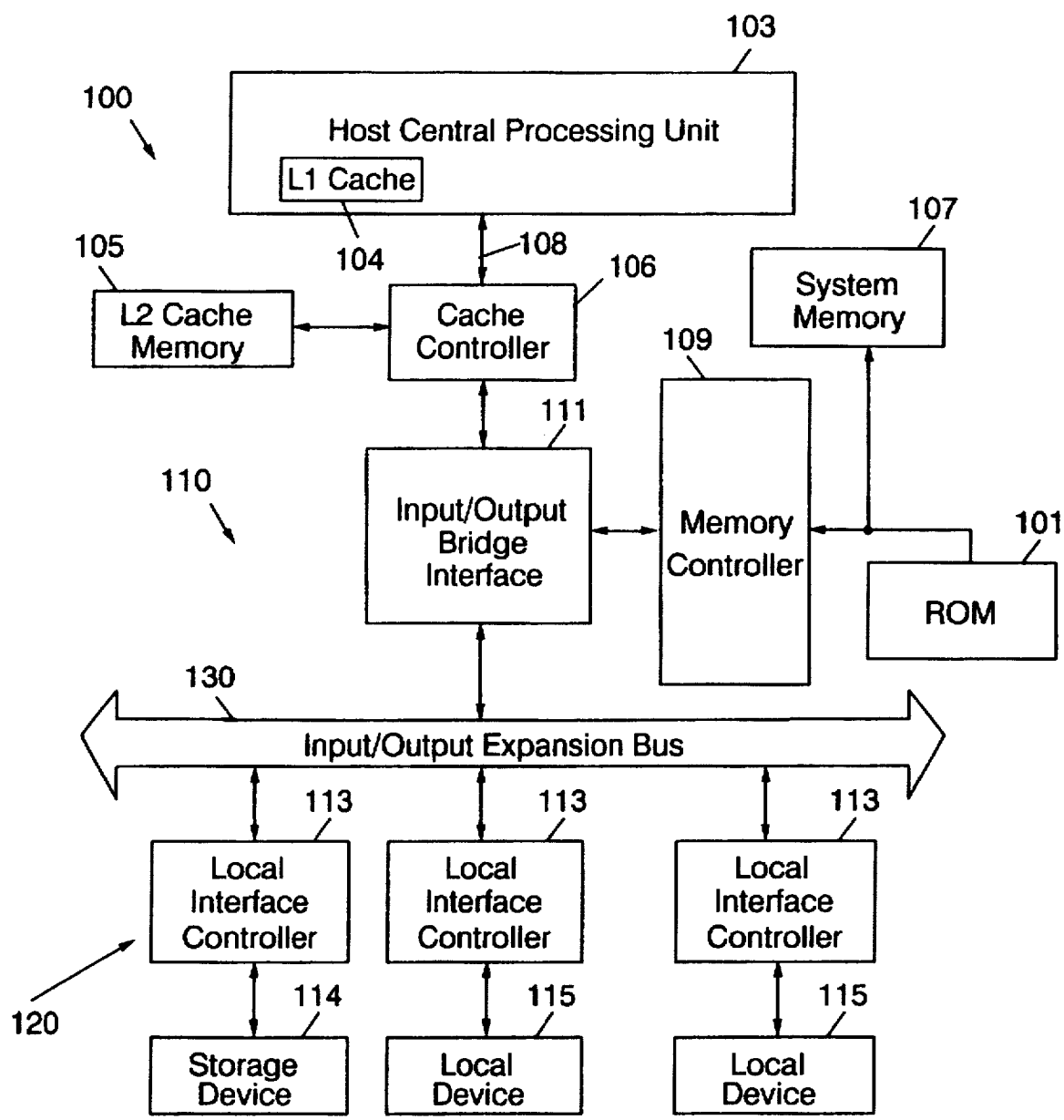
FIG. 1 illustrates a block diagram of a computer system incorporating the cache controller in accordance with the present invention

Referring to FIG. 1, a block diagram of an exemplary computer system 100 incorporating the present invention is shown. The computer system 100 may comprise a Personal Computer System, such as a IBM Personal Computer. The computer system 100 may operate as a stand alone work station or it may be part of a larger computer network operating either as a client station or a server station.

The computer system 100 comprises two processing sides, a host processing side 110 which performs high level processing functions, such as those specified by operating system and applications, and a local processing side 120 which performs peripheral functions, such as providing storage media interface or communication interface for the computer system 100. The host processing side 110 and local processing side 120 are coupled to each other via an input/output (I/O) expansion bus 130. The I/O expansion bus 130 is compliant with one of many suitable I/O expansion bus protocols that allow a local interface controller to take control of the bus for performing a specified function, such as transferring blocks of data across the I/O expansion bus 130. Examples of such bus protocols include those defined by peripheral component interconnect (PCI)and change "Microchannel" to Microcheannel® or MicroChannel® specifications which are hereby incorporated by reference The host processing side 110 may include a single central processing unit 103 or, in a multiprocessing system, a plurality of central processing units for controlling the overall function of the computer system 100. The Central processing unit 103 may be one of many commercially available Central processing units such as Pentium® or Pentium Pro® processors by Intel Corp. of Santa Clara, Calif., or the PowerPC(® processor by International Business Machines (IBM) of Armonk, N.Y. or a PowerPC(R) processor offered by IBM(R) Corporation. As is well known, the Central processing unit 103 initially operates by executing firmware instructions stored in a Read-Only-Memory (ROM) 101. The firmware instructions, also known as Basic I/O System or BIOS may include instructions for detecting attached devices and instructions for a power on self test (POST). Generally, upon completion of the firmware instructions, the Central processing unit 103 executes operating system (QS) instructions by loading the OS from a local side storage device 114 into system memory 107. The transfer of data between the Central processing unit 103, the ROM 101 and the system memory 107 is controlled by a memory controller 109. Whereas, transfer of data between the host processing side 110 and the I/O expansion bus 130 is controlled by an I/O bridge interface 111. The I/O bridge interface 111 is designed to interface between the memory controller 109, the Central processing unit 103 via the cache controller 106, and the I/O expansion bus 130. The Central processing unit 103 interfaces with the I/O expansion bus 130 and consequently with the local processing side 120 via a suitable I/O bus bridge I/O bridge interface 111.

In order to enhance processor performance the Central processing unit 103 may include an internal cache (L1 cache) 104 and an optional external cache (L2 cache) 105 for storing most recently used data and instructions thus obviating the need for initiating long system memory access cycles. The cache memory generally comprises a high speed static random access memory (SRAM) which is positioned in close proximity to the Central processing unit 103. The data transfers in and out of the L1 and L2 caches are controlled by a cache controller 106 which includes a cache prefetching feature according to the present invention. The cache controller 106 interfaces with the CPU through a CPU bus 108 which comprises a data bus, and address bus, and a control bus. The cache controller 106 stores and fetches instructions and data in an integer multiple bits of data-bus width referred to as cache lines.

As the programs are being executed by the CPU, the CPU generates a number of requests relating to transfer of data and instructions from the system memory 107. Such requests may be instruction requests or data requests. Furthermore, depending on the type of request, such request may be for retrieving or reading information from the system memory 107 or storing or writing information into the system memory 107. Therefore, the CPU generates a request type signal indicating the type of request, i.e. instruction or data request, as well as a second control signal indicating transfer direction, i.e. read or write. The CPU signals the request type and transfer direction by activating proper signals on the CPU control bus.

On the local processing side 120, the computer system 100 may include a plurality of local interface controllers 113, such as Small Computer System Interface (SCSI) controllers which are coupled to various peripheral devices 115. As such, storage devices, communication devices, printing devices, networking devices, imaging devices, etc. may be added to complement system functionality and features. For example, the computer system 100 may be utilized as a server station having a Fast Wide SCSI local interface controller with a Redundant Array of Inexpensive Disks (RAID) as storage devices.

One of ordinary skill in the art may appreciate that the above described host and local processing sides 110 and 120 are merely exemplary and depending on the application, various system architectures, uniprocessing or multi processing, may be designed to implement the functional requirement of these processing sides.

Figure 2:
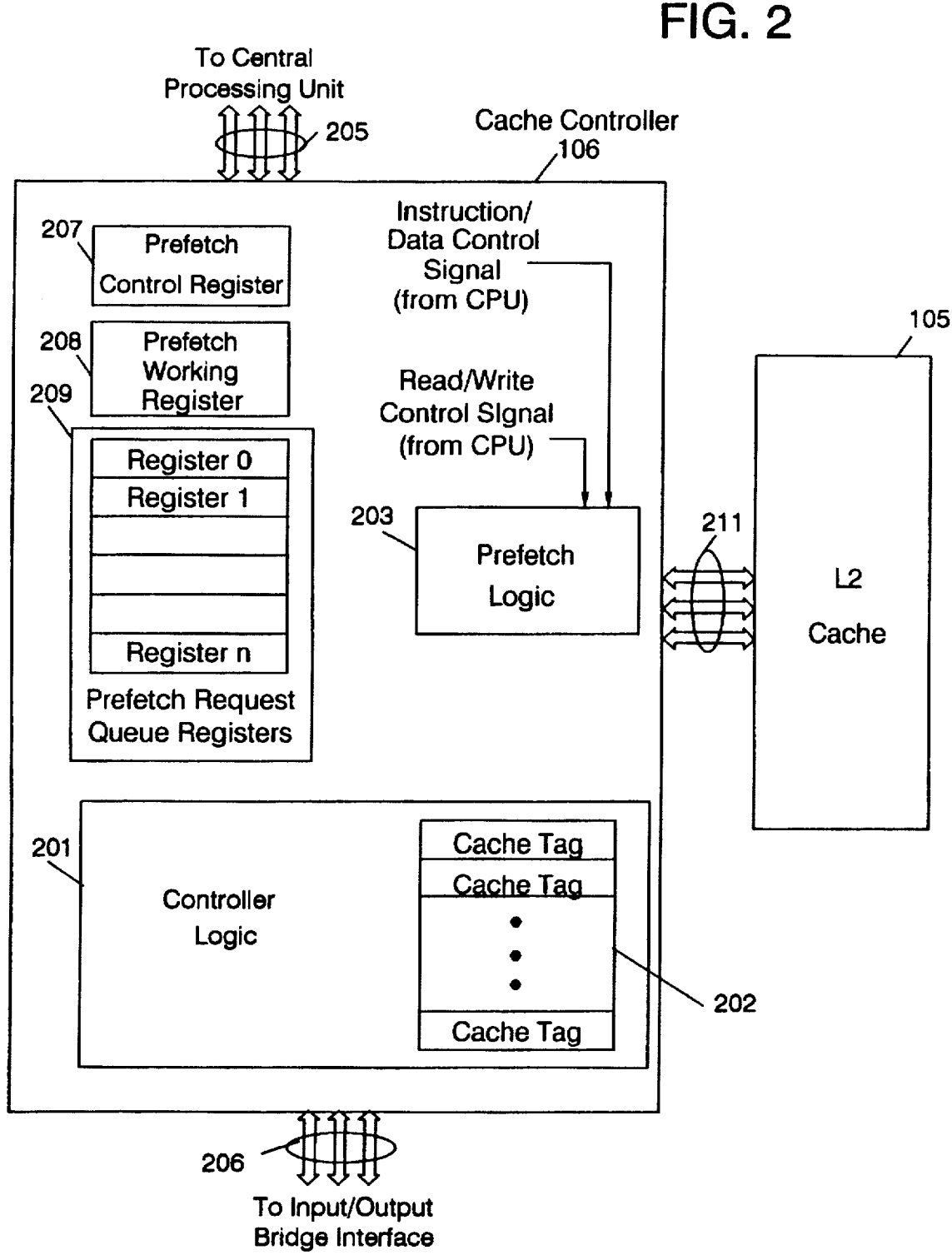
FIG. 2 illustrates a block diagram of a cache controller in accordance with the present invention.

Referring now to FIG. 2, block diagram of the cache controller 106 of FIG. 1 in accordance with the present invention is shown. The cache controller 106 contains controller logic 201 which controls the overall operation of the cache controller 106. The controller logic 201 is responsive to the CPU bus, address, and control bus and includes logic for generating address and control signals for reading and writing to and from the system memory 107 (shown in FIG. 1) and the cache memory 105. Also included within the controller logic 201 are logic circuits and tag registers 202 for determining cache hits and misses. A cache hit occurs when a CPU request for data or instruction is found in the cache memory, whereas, a cache miss occurs when such data is not found in the cache memory. The high speed cache memory 105 is coupled to the cache controller 106 via a well known cache interface bus 211 over which cache data are transferred.

The cache controller 106 includes prefetch logic 203 as well as a number of registers which controls the prefetching function according to the present invention. As described later in detail, a programmable prefetch control register 207 using a number of prefetch control register fields independently controls the amount of prefetching the cache controller 106 will perform for instruction fetches, data reads and data writes. The prefetch control register 207, is addressable by controlling software to store programmable values in each of the prefetch control register fields. A prefetch request queue register set 209 comprising a number of prefetch request queue registers stores a number of outstanding CPU requests for prefetching which have not been serviced by the cache controller 106. A Prefetch working register 208 programmable by the cache controller stores information associated with the currently executing prefetch request.

Figure 3:
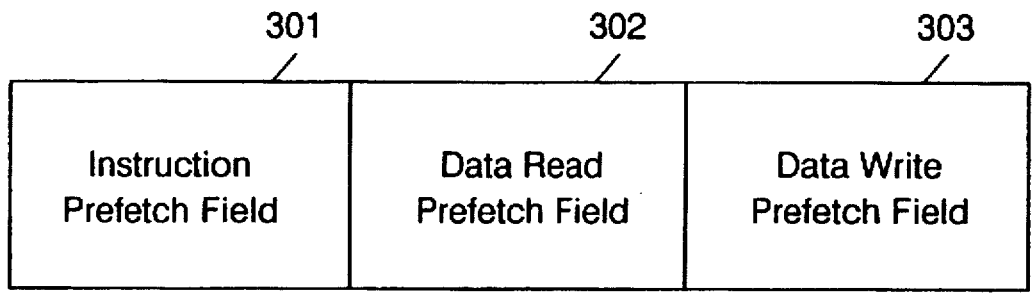
FIG. 3 illustrates a diagram of a Prefetch Control Register (PCR) incorporated in the cache controller of FIG. 2.

Referring to FIG. 3, a diagram of the prefetch control register 207 is shown. The prefetch control register comprises three prefetch control register fields. Namely, an instruction prefetch field 301, a data read prefetch field 302, and a data write prefetch field 303. Depending on a specific implementation, each field of the prefetch control register 207 is composed of a number of bits representing a programmable value indicating a number of cache lines to be prefetched. The instruction prefetch field 301 stores a value representing the number of cache lines that are to be prefetched when the CPU signals a request for an instruction fetch. Similarly, the data read prefetch field 302 stores a value representing the number of cache lines that are to be prefetched when the CPU signals a request for a data read. Finally, the data write prefetch field 303 stores a value representing the number of cache lines that are to be prefetched when the CPU signals a request for a data write.

Figure 4:
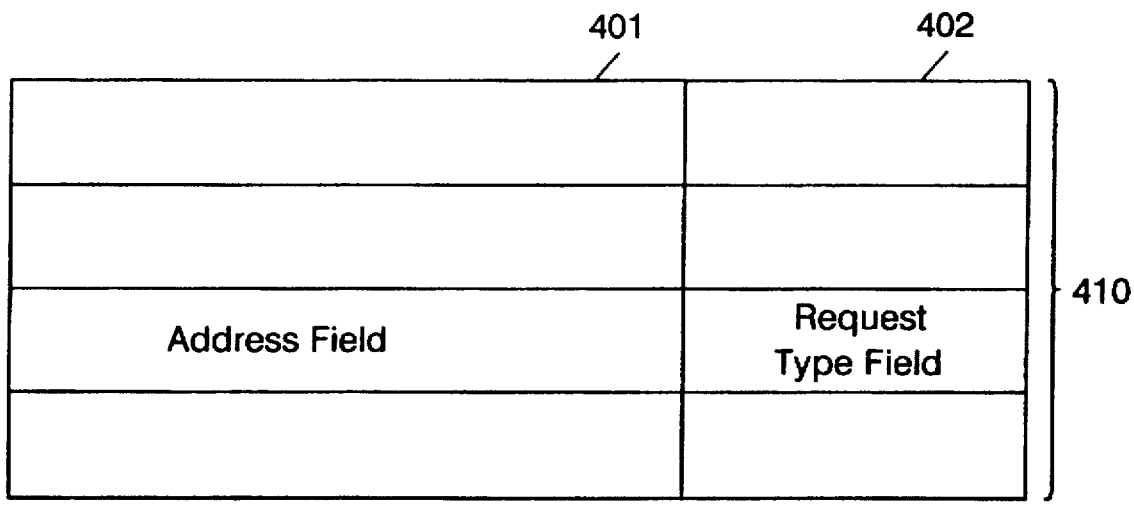
FIG. 4 illustrates a diagram of a Prefetch Request Queue register incorporated in the cache controller of FIG. 2.

Referring to FIG. 4, an exemplary diagram of the prefetch request queue register set 209 is shown. The prefetch request queue register set 209 comprises a number of register elements 410 for storing the address and CPU request type of outstanding requests. The cache controller stores in each register element 410 information relating to the outstanding prefetch requests. Each element 410 comprises two register fields: an address field (401) and a type field (402). The address field is the memory address for the processor request for which prefetching is to be performed. The type field is generated by the cache controller based on the CPU request and transfer type signals and is used to indicate whether the request for which prefetching is to be performed is an instruction fetch, a data read, or a data write.

Figure 5:
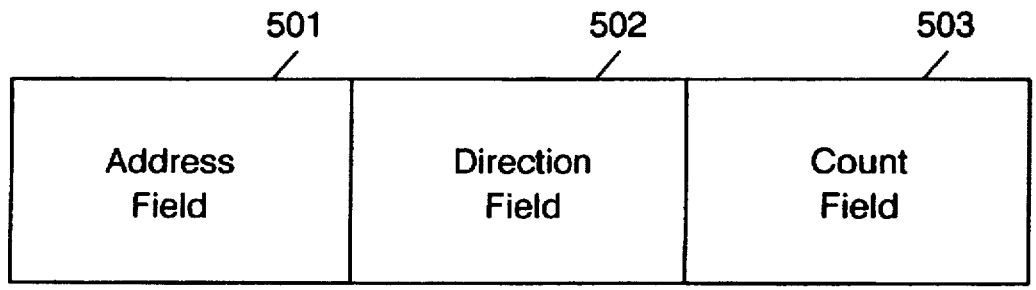
FIG. 5 illustrates a diagram of a Prefetch Working Register (PWR) incorporated in the cache controller of FIG. 2.

Referring to FIG. 5, an exemplary diagram of the Prefetch Working Register (PWR) 208 is shown. The prefetch working register 208 is composed of three fields: the address field (501), the direction field (502), and the count field (503). When a prefetch operation is to be executed, the cache controller 106 loads the Prefetch working register 208 with the information necessary to execute the current prefetch operation. The address field 501 is loaded with a memory address that is initially received from the prefetch request queue element 410's address field 401 and is used to determine the memory address of the cache line that is to be prefetched. The direction field 502 is used to determine whether to sequentially prefetch cache lines from system memory 107 in ascending (up) or descending (down) order. When, the prefetch logic 203 is prefetching in ascending order the cache lines to be prefetched all have memory addresses which are higher than the memory address contained in the address field 501. When the prefetch is prefetching in descending order the cache lines to be prefetched all have memory addresses which are lower than the memory address contained in the address field 501. The count field 503 is used to specify the number of cache lines to prefetch.

Figure 6:
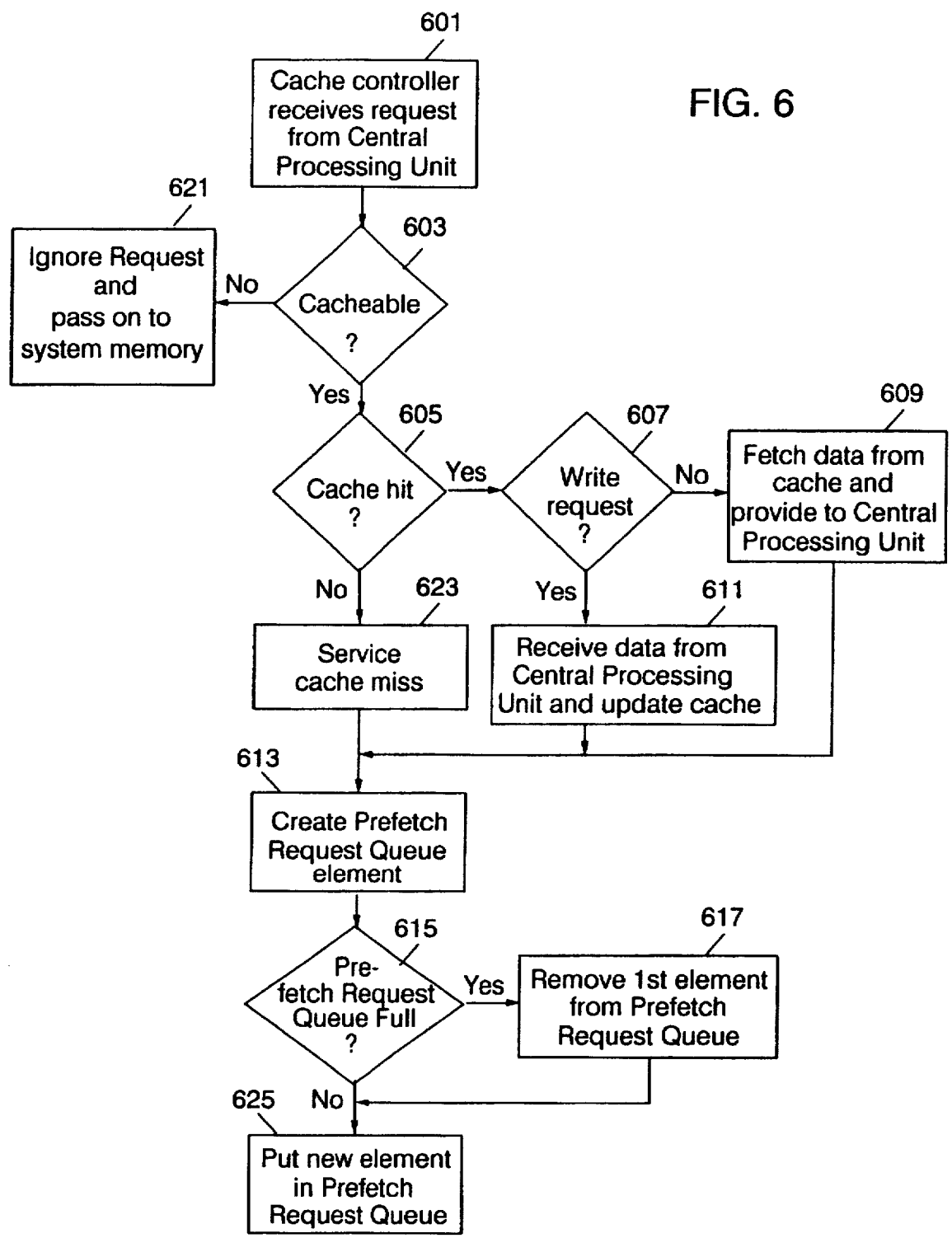
FIG. 6 illustrates a flow diagram of the steps taken by the computer system in accordance with the present invention.

Referring to FIG. 6, an operational flow chart of the steps taken by the computer system in accordance with the present invention is shown. In block 601, the cache controller 106 receives a request from the CPU. In block 603, a determination is made as to whether the request is cacheable or noncacheable. If noncacheable, the cache controller ignores the request and passes it on to the system memory 107. In block 605, the cache controller 106 by examining the cache tag registers 202 determines whether the request is a cache hit or a cache miss. If the request is determined as a cache hits, the cache controller by examining the control bus signals determines whether the request is a read request or a write request in block 607. If a read request, the cache controller 106 fetches the instruction or data from the cache and provides a cache line to the CPU, block 609. If a write request, the cache controller receives the data from the CPU and writes it into the cache and updates the registers 202 according to a predefined cache coherency protocol, block 611. Upon occurrence of a cache miss, the cache miss is serviced according to the cache coherency protocol, block 623. At this time, the cache controller 106 creates a prefetch request queue element 410, block 613. After creation of a prefetch request queue element 410, a determination is made as to whether the number of queue elements exceed a predefined number, i.e., whether the prefetch queue is full in block 615. If fall, the first element of the queue, i.e., the oldest unserviced request, is removed from the queue. At this stage or if the queue is not full, the prefetch request element is placed in the queue in block 625.

Figure 7:
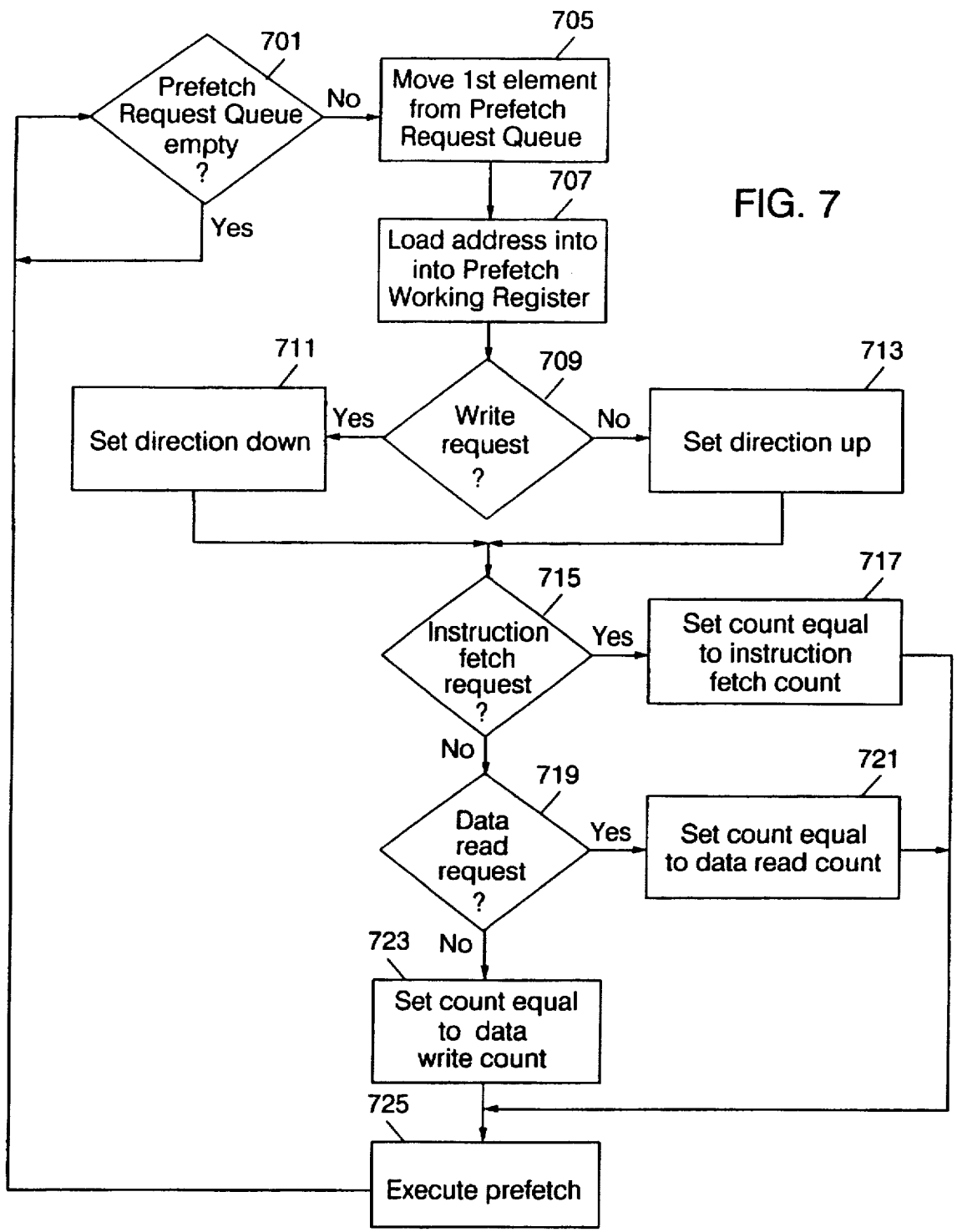
FIG. 7 illustrates a flow diagram of the steps taken by the prefetch logic in accordance with the present invention.

Referring to FIG. 7, an exemplary operational flow chart of the steps taken by the prefetch logic 203 is shown. The prefetch logic 203 continuously checks the contents of the prefetch request queue to determine if the queue is empty, block 701. If the queue is not empty, the prefetch logic 203 removes the first element or request from the prefetch request queue, block 705. Then, prefetch logic 203 loads the address portion of the prefetch working register 208 with the address contained in the address field 401 of the queue element, block 707. In block 709, based on the request type contained in the type field 402, the prefetch logic determines whether the request is a read or a write request. If a write request, the prefetch logic 203 will set the direction field 502 to a value representing a descending order direction, block 711. Conversely, if a read request, the prefetch logic 203 will set the direction field 502 to a value representing an ascending order direction, block 713. In block 715, a determination is made as to whether the CPU request is for an instruction fetch. If so, the count field 503 of the working register is set to a value represented by the value contained in the instruction prefetch field 301 of the prefetch control register 207. If not, in block 719, the prefetch logic 203 determines whether the request is a data read request. If so, the count field 503 of the working register is set to a value represented by the value contained in the data read prefetch field 302 of the prefetch control register 207, block 721. If not, it is assumed that the request is a data write request and the count field 503 of the working register is set to a value represented by the value contained in the data write field 303 of the prefetch control register 207, block 723. Then, the prefetch logic 203 based on the values loaded in the count field 503 starts to prefetch a number of cache lines from the system memory at a starting address indicated by the address field 501 and in a direction as indicated by the direction field 502, block 725. Upon completion of the current prefetching operation, the flow chart returns to block 701 to determine whether other outstanding prefetch requests need to be serviced.

What is claimed is:

1. A computer system, comprising
   a main memory;
   a central processing unit (CPU) generating a first CPU control signal indicating whether a request for information is a request for an instruction or a request for data and for generating a second CPU control signal indicating whether the request for information is for retrieving information from memory or for storing information into memory;
   a cache memory system having a cache memory; and
   a cache controller coupled to the cache memory and having registers and prefetch logic responsive to said first CPU control signal and said second CPU control signal for determining the amount of data to be prefetched into the cache memory from the main memory.

2. The computer system of claim 1, wherein said cache memory system comprises a hierarchical cache system and wherein said cache memory comprises a first high level cache memory and a second lower level cache memory.

3. The computer system of claim 1, wherein the cache controller includes a programmable prefetch control register for storing a value representing a programmable number of cache lines to be prefetched.

4. The computer system of claim 3, wherein said cache controller is responsive to the first CPU control signal indicating an instruction request for prefetching the number of cache lines represented by the value stored in the programmable prefetch control register.

5. The computer system of claim 1, wherein the cache controller includes a programmable prefetch control register for storing a value representing a programmable number of cache lines to be prefetched when the first CPU control signal indicates a data request and said second CPU control signal indicates that the data request is for retrieving information from the main memory.

6. The computer system of claim 5, wherein said cache controller is responsive to the first CPU control signal indicating a data request and the second to control signal indicating a data request for retrieving information from the main memory for prefetching the number of cache lines represented by the value stored in the programmable prefetch control register.

7. The computer system of claim 1, wherein said cache controller includes a programmable prefetch control register for storing a value representing a programmable number of cache lines to be prefetched when the first CPU control signal indicates a data request and said second CPU control signal indicates that the data request is for storing information into the main memory.

8. The computer system of claim 7, wherein said cache controller is responsive to the first CPU control signal indicating a data request and the second CPU control signal indicating a data request for storing information into the main memory for prefetching the number of cache lines represented by the value stored in the programmable prefetch control register.

9. The computer system of claim 1, wherein said cache controller includes a prefetch queue register set including a number of prefetch queue registers for storing a number of outstanding CPU requests for prefetching.

10. The computer system of claim 9, wherein each of said prefetch queue registers includes a first register field for storing the address of a respective CPU request and a second field for storing a request type based on the first CPU control signal and the second CPU control signal.

11. The computer system of claim 10, wherein said prefetch logic is responsive to the request type for determining whether the prefetching from the main memory is in ascending or descending order.

12. The computer system of claim 11, wherein the cache controller prefetches information from the main memory in an ascending order when the request type indicates a data request for retrieving information from the main memory, and wherein the cache controller prefetches information from the main memory in a descending order when the request type indicates a data request for storing information into the main memory.

* * * * *